United States Patent [19]

Belart et al.

[11] 3,815,961

[45] June 11, 1974

[54] MASTER CYLINDER FOR A TWO-CIRCUIT BRAKE SYSTEM

[75] Inventors: Juan Belart, Walldorf; Anton David, Gotzenhain, both of Germany

[73] Assignee: ITT Industries, Inc., New York, N.Y.

[22] Filed: Nov. 22, 1972

[21] Appl. No.: 308,862

[30] Foreign Application Priority Data
Dec. 24, 1971  Germany............................ 2164591

[52] U.S. Cl................................. 303/52, 137/627.5
[51] Int. Cl.............................................. B60t 15/06
[58] Field of Search ............. 303/52, 54; 137/627.5

[56] References Cited
UNITED STATES PATENTS
3,355,223  11/1967  Klimek................................. 303/52
3,638,528  2/1972  Lewis......................................... 91/6
3,692,367  9/1972  Kuromitsu ............................ 303/54

Primary Examiner—Edgar W. Geoghegan
Assistant Examiner—A. M. Zupcic
Attorney, Agent, or Firm—John T. O'Halloran; Menotti J. Lombardi, Jr.; Alfred C. Hill

[57] ABSTRACT

This relates to a master cylinder for a two-circuit brake system having brake pressure medium supplied under pressure to both brake circuits from an associated brake pressure medium reservoir. The master cylinder includes two tandemly related axially displaceable control pistons. Each of these control pistons include an inclined control surface in contact with a push rod for a valve through which the pressurized brake pressure medium to actuate the associated one of the brake circuits. When the brake pedal is depressed the control pistons move in a manner to enable the inclined control surfaces to open their associated valve and thereby apply pressurized brake pressure medium from the associated one of the reservoirs to the associated one of the brake circuits.

16 Claims, 1 Drawing Figure

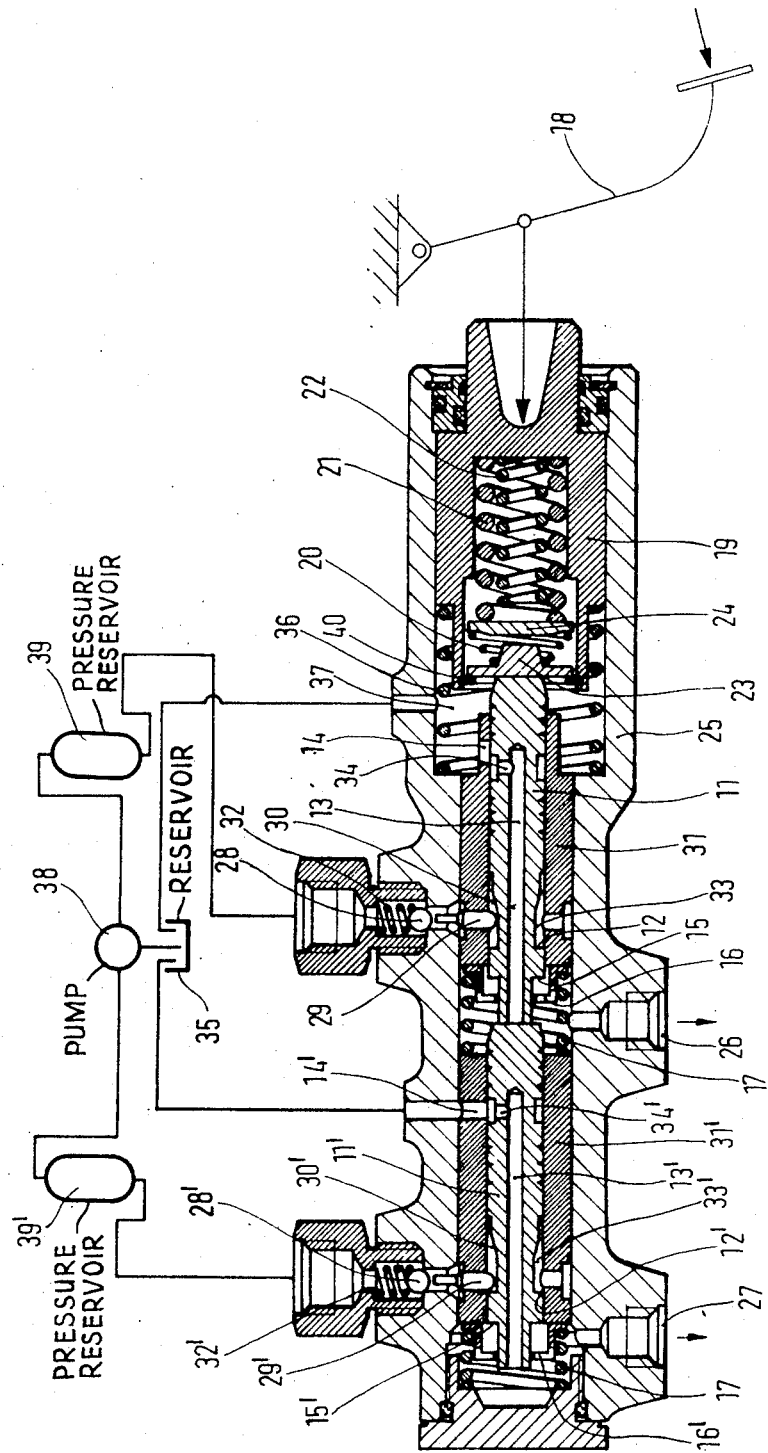

MASTER CYLINDER FOR A TWO-CIRCUIT BRAKE SYSTEM

BACKGROUND OF THE INVENTION

The invention relates to a master cylinder for a pressure reservoir two-circuit brake system, especially for cars, with two axially displaceable control pistons applying a reservoir pressure to first and second brake circuits after displacement being caused by actuation of the brake pedal.

The reservoirs supplying the reservoir pressure are so designed that in case of a failure of the pump generating the reservoir pressure several brake applications are still possible.

SUMMARY OF THE INVENTION

An object of the present invention is to provide a master cylinder of the above described type in which pressure loss can largeley be avoided, in which in case of braking the brake circuits are immediately supplied with pressure, and in which in case of failure of one brake circuit the remaining brake circuit can still be pressure-applied.

Another object of the present invention is to provide a master cylinder of the above described type which will be economical concerning production, easy to assemble, easy to maintain and suited to large-scale assembly line production.

A feature of the present invention is the provision of a master cylinder for a two-circuit brake system comprising: a source of pressurized brake pressure medium; a hollow cylindrical housing having a longitudinal axis; a first control piston disposed coaxially of the axis within the housing, the first control piston being axially displaceable within the housing to apply pressure to a first brake circuit, the first control piston including a first control surface on the outer surface thereof; a second control piston disposed coaxially of the axis within the housing and in tandem relation to the first control piston, the second control piston being axially displaceable within the housing to apply pressure to a second brake circuit, the second control piston including a second control surface on the outer surface thereof; a first normally closed valve mounted on the housing coupled to the source, the first valve having a first push rod extending radially through the housing to engage the first control surface so that actuation of the first control piston moves the first push rod radially to open the first valve and apply pressure from the source to the first brake circuit; and a second normally closed valve mounted on the housing coupled to the source, the second valve having a second push rod extending radially through the housing to engage the second control surface so that actuation of the second control piston moves the second push rod radially to open the second valve and apply pressure from the source to the second brake circuit.

In accordance with the present invention valves are operated by push rods extending through the wall of the master cylinder which control the reservoir pressure supply of the brake circuits and whose push rods are actuated by control surfaces contained on the associated control piston. By virtue of this construction the pressure is transmitted to the brake circuits after the opening of the valves, and no pressure loss arises because the reservoir pressure is applied first to the interior of some pistons or cylinders.

According to a preferred design the control pistons are axially displaceable in sleeves which are fixed in the cylinder with axial spacing. Thus, the sleeves and the control pistons can be produced first with regard to the requirements of accuracy and then they are installed in the cylinder, which has been adequately prepared.

The valve push rods are radially displaceable in the wall of the sleeves. Preferably the valves are globe valves which are prestressed by springs in the direction of the reservoir pressure flow and in the opposite direction of the push rod movement in the closing direction. This design is economical in production and characterized by high operating safety.

For reasons of expediency both ends of the control pistons are cylindrical. The pistons are provided with ring-shaped recesses to form the control surfaces and to accommodate the ends of the push rods. Thus, the ring-shaped recesses are completely shut off from the outside by the cylindrical parts behind and before them which have the same diameter. For practical reasons the ring-shaped recesses have a cylindrical front part and an upward-sloping rear part, thus, forming the control surfaces. With the brake pedal in released position, the valve push rods sit on the peripheral area of the cylindrical front part of the recesses. When the control pistons are actuated the valve push rods slide along the upward-sloping part to open the valves.

At the transition point from the cylindrical front part of the control pistons to the ring-shaped recess a guiding edge is formed which is of great importance to the functioning of the present invention. This guiding edge is predeterminedly spaced from the front end of the accompanying sleeve so that during the displacement of the control pistons the reservoir pressure is present in the ring-shaped recess until the guiding edge passes the sleeve end. The valve is, thus, favorably opened somewhat earlier than the moment when the guiding edge opens the port hole to the brake circuits.

A particularly preferred design of the master cylinder of the present invention is that the control pistons while occupying the same relative position are installed so close to the guiding edges that in case of a failure of the first brake circuit the first control piston can mechanically apply pressure to the second control piston. If both circuits function normally the second control piston is actuated by the pressure of the first brake circuit, whereas mechanical pressure application will only be used in case of failure of the first brake circuit. This design ensures a high degree of safety. For reasons of an economical large-scale assembly line production both control pistons are identical. This also ensured that both brake circuits have approximately the same pressure.

Furthermore the control pistons are provided with axial bores extending from the front end of the piston to that point where a radial bore is provided in the wall of the piston leading to the piston surface and which are connected to the reservoir when the control pistons are in released position. Thus, the pressure relief of the brake circuits, after braking action, is guaranteed in an effective way.

In order to connect the reservoir to the radial bores, the radial bores, in the released position of the pistons are aligned with the radial bores of the sleeves leading to the reservoir.

In another especially preferred design the movement of the control pistons are restricted by stops in such a manner that the port hole at the guiding edges can only be opened as small an amount as desired. Thus, a too sudden pressure application of the brake circuits can be avoided which would occur, e.g., in case of too sudden braking. This proves to be a very effective safety measure.

An additional design of the master cylinder of the present invention is that the front parts of the control pistons have a ring-shaped step and that the stops are ring-shaped sleeves which are slid on to the tapered front part of the pistons and which are connected with the cylinder.

It is extremely favorable when the first stop is spring-loaded. The first stop spring shall be so strong that it is not compressed when the brake circuits function normally, but that in case of failure of the first brake circuit it can be compressed to such a degree that the first control piston can mechanically displace the second control piston so that pressure is applied to the second brake circuit. Thus, the first control piston is stopped only during normal braking action whereas it is overdriven in case of failure of the first brake circuit.

From the manufacturing point of view it is extremely favorable when the stop spring is a compression spring stretching from the second sleeve to a flange of the ring sleeve.

The stop of the second control piston is preferably spring-loaded, too, in the same direction as the first stop. Thereby a very favorable tolerance compensation is reached. Furthermore, an identical ring-shaped sleeve and an identical spring may be used for the second control piston which is desirable for manufacturing reasons.

In a further design the first control piston is loaded by a movement simulator which is actuated by the brake pedal. Preferably a type of piston is chosen as the movement simulator whose open end points towards the first control piston and is closed by a spring-loaded stop plate that interacts with the first control piston.

According to the present invention a weak spring is provided between the stop plate and a spring retainer mounted within the movement piston close to the stop plate. This spring is just strong enough to displace the first control piston sufficient to open the port hole at the guiding edge. Thus, a certain space exists between the spring retainer and the stop plate before the port hole at the guiding edge is opened. This space, however, disappears at once when the port hole is opened.

A rather powerful spring is installed between the bottom of the movement piston and the spring retainer, which causes the desired pedal travel when pressure is applied to the first brake circuit. Favorably a second somewhat weaker spring is mounted between the bottom of the movement piston and the spring retainer, which becomes effective only after a certain compression of the parallel running powerful spring. This arrangement guarantees longer pedal travel. Only a slight displacement is required for the control piston to open the port hole, which turns out to be rather advantageous for the driver. By means of the installation of a second spring, which becomes effective after a certain compression of the first spring, the force of reaction is increased progressively, which is also desirable since this corresponds more to the condition of a traditional brake.

The brake power simulator is provided with a return spring that causes the simulator to return to its initial position after completion of the braking action.

In accordance with the design of the master cylinder of the present invention, the radial bore of the first sleeve leads into the accommodating section for the return spring, which is connected to the reservoir. Thus, it is guaranteed that all parts of the movement simulator are also reached by the brake fluid. It is extremely favorable if one pump applies two reservoirs each of which is connected with one of the two valves since the safety factor of the brake system according to the present invention is considerably increased.

BRIEF DESCRIPTION OF THE DRAWING

The above-mentioned and other features and objects of this invention and the manner of obtaining them will become more apparent by reference to the following description taken in conjunction with the drawing, the single FIGURE of which illustrates a longitudinal cross section of the master cylinder according to the principle of the present invention. The devices applying pressure to the master cylinder are only schematically illustrated.

DESCRIPTION OF THE PREFERRED EMBODIMENT

In the FIGURE a master cylinder 25 is provided with two sleeves 31 and 31' being mounted therein in spaced axial relation and having cylindrical axial bores in which axially displaceable control pistons 11 and 11' are installed. According to the present invention control pistons 11 and 11' are identical and between two cylindrical areas of the same diameter they provide ring-shaped recesses 33 and 33' which are at first cylindrical and then upward-sloping to form the control surfaces 30 and 30'.

At the transition point of the ring-shaped recesses 33 and 33' adjacent the cylindrical portions thereof guiding edges 12 and 12' are formed on pistons 11 and 11' interacting with the ends of sleeves 31 and 31'. The control pistons 11 and 11' are provided with axial bores 13 and 13' starting in the cylinder areas bordering the brake circuits 26 and 27, respectively, and ending in the sealed-off rear part of control pistons 11 and 11' where they join the radial bores 34 and 34', that lead to the outside. On the drawing, which shows the brakes in released position, radial bores 34 and 34' are aligned with the corresponding radial bores 14 and 14' of sleeves 31 and 31' or the wall of cylinder 25, respectively. The radial bores 14 and 14' are connected by pressure medium lines with the reservoir 35 of the hydraulic system.

According to the invention control pistons 11 and 11' are provided with a ring-shaped step 15 and 15' at their front end, so that cylindrical projections with a reduced diameter are formed at the front end on which displaceable ring-shaped sleeves 16 and 16' are mounted that function as stops. In the invention ring-shaped sleeves 16 and 16' are pressed against sleeves 31 and 31' by means of compression springs 17 and 17' which are fastened at the cylinder bottom or at sleeve 31'. The space between the ring-shaped areas functioning as stops and ring-shaped steps 15 and 15' is so designed that when guiding edges 12 and 12' has just passed the end of sleeves 31 and 31' and the port hole is opened when step 15 strikes against stops 16.

The push rods 29 and 29' of the globe valves 28 and 28', which are mounted radially displaceable in sleeves 31 and 31', interact with ring-shaped recesses 33 and 33', that have pressurized brake fluid applied thereto by two reservoir 39 and 39', which in turn are pressurized by one pump 38.

The globe of globe valves 28 and 28' is prestressed by the compression springs 32 and 32' in the closing direction.

According to the invention the brake pedal 18 actuates a stopping distance or movement simulator which will make the relatively short travel of control pistons 31 and 31' appear more extensive to the driver. The simulator consists of a cup-shaped type of piston 19 whose open end points towards first control piston 11 and is covered by a stop plate 23 which lies against a stop 40. A weak spring 20 presses the stop plate against stop 40. The other end of weak spring 20 rests against a spring retainer 24 which in turn is connected with a relatively strong spring 21 that is fastened at the bottom of piston 19. Another compression spring 22 is installed within spring 21, this spring is somewhat weaker and stretches from the bottom of piston 19 to a point in the immediate vicinity of spring retainer 24.

Piston 19 is prestressed to the right by a return spring 36 anchored at cylinder 35, as is seen in the drawing.

According to this invention sleeve 31 protrudes into the accommodation area 37 of spring 36 so that radial bore 14 ends in accommodation area 37, which in turn is connected by a pressure medium line to reservoir 35.

According to the present invention the master cylinder functions as follows:

When the brake pedal 18 is pressed piston 19 moves control piston 11 to the left overriding stop plate 23. Spring 20 is so designed that it is not compressed during this displacement. At this stage piston 11 is still in contact with piston 11'.

In the course of this movement push rod 29 moves upwards along control surface 30 and globe valve 28 is opened and the pressure of reservoir 39 enters into recess 33. When this movement is continued guiding edge 12 overrides the end of sleeve 31. Now the master cylinder section leading to brake circuit 26 is pressure-applied, which results in an immediate compression of spring 20 and, thus, causes element 23 to touch element 24. Furthermore, second control piston 11' is applied with the pressure of first brake circuit 26 and moves to the left on the drawing whereupon valve 28' is opened and guiding edge 12' overrides the end of sleeve 31'. Now second brake circuit 27 is applied with the pressure of reservoir 39'.

The occurring reaction forces, i.e. the diameter of the control pistons 11 and 11', are so dimensioned that the reaction force at brake pedal 18 corresponds approximately to that of a traditional brake. Thus, a pressure is produced in the brake circuits which corresponds to the force applied to brake pedal 18.

The stronger brake pedal 18 is pressed the stronger spring 21 is at first compressed. Thus, a longer travel of the control pistons is simulated to the driver. After the achievement of a certain braking power spring 22 which is parallel to spring 21 touches spring retainer 24 so that when the braking action is continued, i.e. the brake pedal is pressed down even stronger, the pedal cannot be pressed down completely, which corresponds to the feeling of a traditional brake in which the pedal travel decreases with increasing pedal effort. Thus, the driver is in every respect given the feeling of a traditional brake during braking.

If first brake circuit 26 should fail, i.e. become pressureless, step 15 strikes stop 16 during braking action. Now, however, the opening of the port hole at guiding edge 12 does not affect the pressure in first brake circuit 26. The normally occurring reaction force is suppressed and the driver can compress spring 17 by further pressing down brake pedal 18. In doing this second control piston 11' is mechanically pushed far enough to the left so that valve 28' is opened and at least the second brake circuit is applied with pressure after guiding edge 12' has passed the end of sleeve 31'.

If second brake circuit 27 fails, however, second control piston 11' is at first moved up to the edge of step 15' at stop 16' after pressure has been built up in brake circuit 26. Since there is no reaction force because of the failure of second brake circuit 27, control piston 11' continues to move while compressing spring 17' either until the spring 17' is completely compressed or until the cylindrical projection of piston 11' strikes the bottom of the cylinder. The pressure application of first brake circuit 26, however, is still guaranteed.

After the completion of the braking piston 19 and brake pedal 18 are returned to the initial position by means of return spring 36. The pressure in brake circuits 26 and 27 causes control pistons 11 and 11' to return to their initial position until radial bores 34 and 34' are aligned with bores 14 and 14' in the sleeves and the pressure can be released into reservoir 35.

The ring-shaped recesses 33 and 33' have to be long enough so that they do not obstruct the alignment of radial bores 34 and 34' with bores 14 and 14'.

During normal braking the spacing between control pistons 11 and 11' is so small that in case of a failure of first brake circuit 26 no sudden movement of the pedal through the full travel is felt.

Stop rings 16 and 16' are an essential feature of the invention. They prevent an overload of the brake, i.e. a pressure increase beyond the desired value during the introduction of the braking action. This causes a sudden reaction force to occur at brake pedal 18 because of piston 11 moving back. Furthermore vibration of the control pistons may arise which despite simulator 19 provokes an unpleasant feeling at brake pedal 18. The port, which is limited by stops 16 and 16' should favorably be up to 0.5 mm wide, in particular 0.05 – 0.025 mm. The pressure which is built up by limiting the port hole when actuating the brake corresponds to the force applied to the pedal during this phase, whereby overloading is avoided.

While we have described above the principles of our invention in connection with specific apparatus it is to be clearly understood that this description is made only by way of example and not as a limitation to the scope of our invention as set forth in the objects thereof and in the accompanying claims.

We claim:

1. A master cylinder for a two-circuit brake system comprising:
  a source of pressurized brake pressure medium;
  a hollow cylindrical housing having a longitudinal axis;

a first control piston disposed coaxially of said axis within said housing, said first control piston being axially displaceable within said housing to apply pressure to a first brake circuit, said first control piston including a first control surface on the outer surface thereof;

a second control piston disposed coaxially of said axis within said housing and in tandem relation to said first control piston, said second control piston being axially displaceable within said housing to apply pressure to a second brake circuit, said second control piston including a second control surface on the outer surface thereof;

a first normally closed valve mounted on said housing coupled to said source and said first brake circuit, said first valve having a first push rod extending radially through said housing to engage said first control surface so that actuation of said first control piston moves said first push rod radially to open said first valve and apply pressure from said source to said first brake circuit during a normal braking process;

a second normally closed valve mounted on said housing coupled to said source and said second brake circuit, said second valve having a second push rod extending radially through said housing to engage said second control surface so that actuation of said second control piston moves said second push rod radially to open said second valve and apply pressure from said source to said second brake circuit during a normal braking process;

a first sleeve disposed coaxially of said axis between the inner surface of said housing and the outer surface of said first control piston, said first sleeve having a radial aperature in the wall thereof to receive said first push rod; and a second sleeve disposed coaxially of said axis between the inner surface of said housing and the outer surface of said second control piston, said second sleeve having a radial aperture in the wall thereof to receive said second push rod;

said first and second sleeves being axially spaced from each other; each of said first and second valves including
a globe valve prestressed by springs in the direction of flow of said pressure medium from said source;

both ends of each of said first and second control pistons including
a cylindrical portion of given diameter, and
a ring-shaped recess disposed between said cylindrical portions, said recess providing an associated one of said first and second control surfaces and receiving an end of an associated one of said first and second push rods;

each of said ring-shaped recesses including
a cylindrical part adjacent an outlet to one of said first and second brake circuits, and
an upward-sloping part remote from said outlet extending from said cylindrical part;

each of said first and second sleeves having one end thereof spaced a predetermined distance from a transition edge between said cylindrical part of said ring-shaped recesses and said cylindrical portion of the adjacent end of said first and second control pistons, said predetermined distance being selected so that when an associated one of said first and second valves open due to actuation of the associated one of said first and second piston the pressure from said source is retained in the associated one of said ring-shaped recesses until said transition edge and said one end of an associated one of said first and second sleeves provide a port between an associated one of said ring-shaped recesses and an associated one of said outlets to an associated one of said first and second brake circuits;

adjacent ends of said first and second control pistons being spaced an amount less than said predetermined distance so that in case of failure of said first brake circuit said first control piston can mechanically actuate said second control piston; and each of said first and second control pistons including an axial bore in communication at one end with an outlet to an associated one of said first and second brake circuits, and a first radial bore in communication with the other end of said axial bore extending to the surface of an associated one of said first and second control pistons for connection to a pressure medium reservoir.

2. A master cylinder according to claim 1, wherein each of said first and second sleeves including
a second radial bore in communication with said reservoir, said second radial bore being aligned with said first radial bore when said first and second control pistons are unactuated.

3. A master cylinder according to claim 2, further including
two stops, one to limit the motion of said first control piston and the other to limit the motion of said second control pistons to provide a predetermined opening for each of said ports.

4. A master cylinder according to claim 3, wherein each of said first and second control pistons includes a cylindrical projection having a diameter less than said given diameter extending from an end of an associated one of said first and second control pistons adjacent said outlet for an associated one of said first and second brake circuits; and a step between said projection and said end of an associated one of said first and second control pistons;

each of said stops include
a ring-shaped sleeve slid onto an associated one of said projections and connected to said housing, the distance said ring-shaped sleeve is slid onto said associated one of said projections determines said predetermined opening for each of said ports.

5. A master cylinder according to claim 4, further including
a first spring to spring load said ring-shaped sleeve associated with said first control piston.

6. A master cylinder according to claim 5, wherein said first spring has a predetermined resilience so that it is not compressed during braking when both of said first and second brake circuits are intact, but will become compressed due to pressure loss in said first brake circuit so that said first control piston can mechanically displace said second control piston sufficient to apply pressure to said second brake circuit.

7. A master cylinder according to claim 6, wherein said first spring extends between an end of said second sleeve adjacent said ring-shaped sleeve associated with said first piston and said ring-shaped sleeve associated with said first piston.

8. A master cylinder according to claim 7, further including
a second spring to spring load said ring-shaped sleeve associated with said second control piston.

9. A master cylinder according to claim 8, further including
a stopping distance simulator actuated by a brake pedal to actuate said first control piston.

10. A master cylinder according to claim 9, wherein said simulator includes
a cup shaped piston disposed coaxially of said axis within said housing, the opening of said piston being disposed adjacent one end of said first control piston, and
a spring loaded stop plate disposed transverse of said axis to close said opening of said cup shaped piston and to interact with said one end of said first control piston.

11. A master cylinder according to claim 10, wherein said simulator further includes
a spring retainer disposed between said stop plate and the bottom of said cup shaped piston, and
a third spring disposed between said stop plate and said spring retainer, said third spring being just strong enough to displace said first control piston sufficient to open said port associated with said first control piston.

12. A master cylinder according to claim 11, wherein said simulator further includes
a fourth spring which is relatively strong disposed between the bottom of said cup shaped piston and said spring retainer to permit desired brake pedal travel when pressure is applied to said first brake circuit.

13. A master cylinder according to claim 12, wherein said simulator further includes
a fifth spring which is weaker than said fourth spring disposed between the bottom of said cup shaped piston and said spring retainer becoming effective only after said fourth spring has been compressed a given amount.

14. A master cylinder according to claim 13, further including
an outwardly extending step in the inner surface of said housing adjacent said cup-shaped piston, and a return spring for said cup-shaped piston extending between said step of said housing and said cup shaped piston.

15. A master cylinder according to claim 14, wherein said step of said housing, the inner surface of said housing parallel to said axis and the adjacent end of said cup shaped piston provides an area to accommodate said return spring, said area being in communication with said reservoir, and
said second radial bore in said first sleeve communicates with said area.

16. A master cylinder according to claim 15, wherein said source includes
a single pump coupled to said reservoir, and
a pair of pressure reservoirs pressurized by said pump, each of said pressure reservoirs being connected to a different one of said first and second valves.

\* \* \* \* \*